Oct. 27, 1931.    R. M. SCOGGINS    1,829,458
PIPE JOINT REAMER
Filed Feb. 10, 1930    2 Sheets-Sheet 1
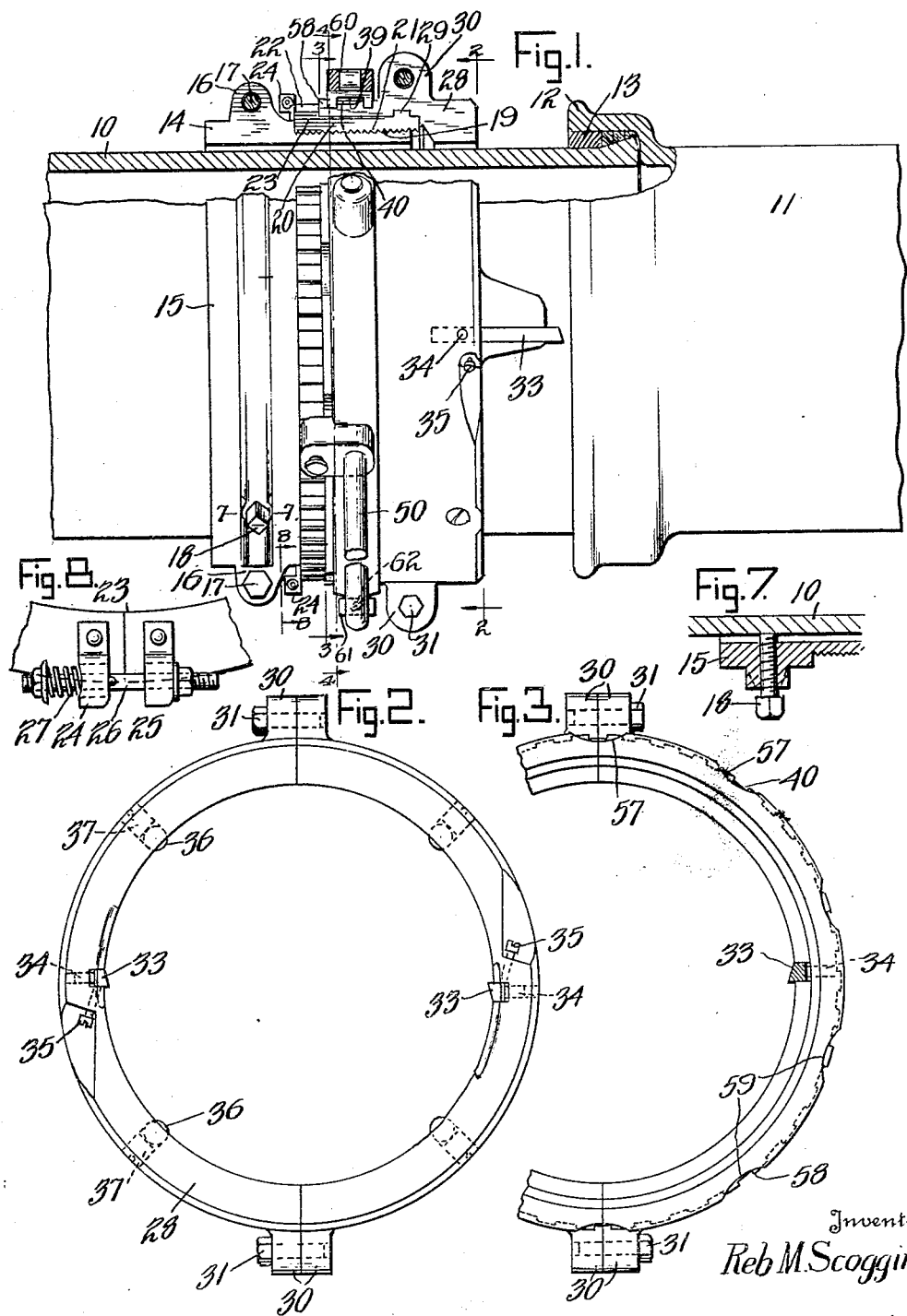
Inventor
Reb M. Scoggins

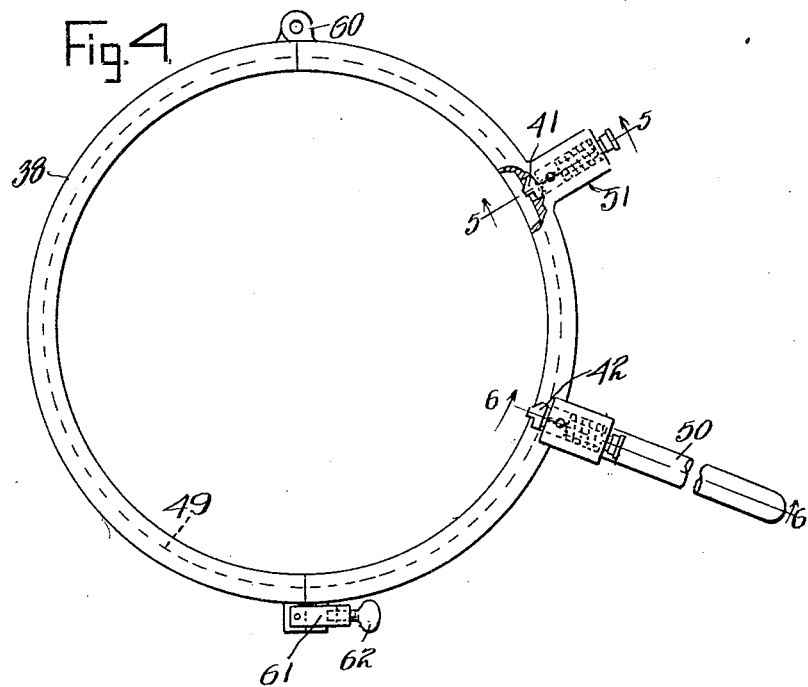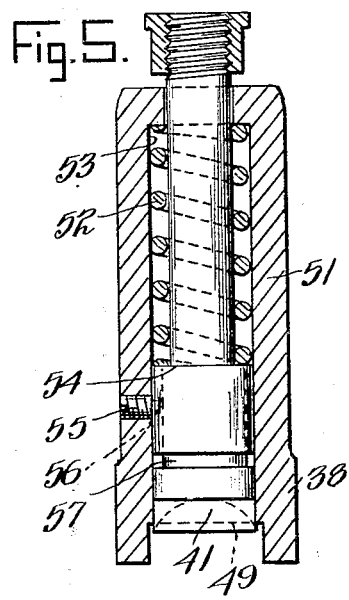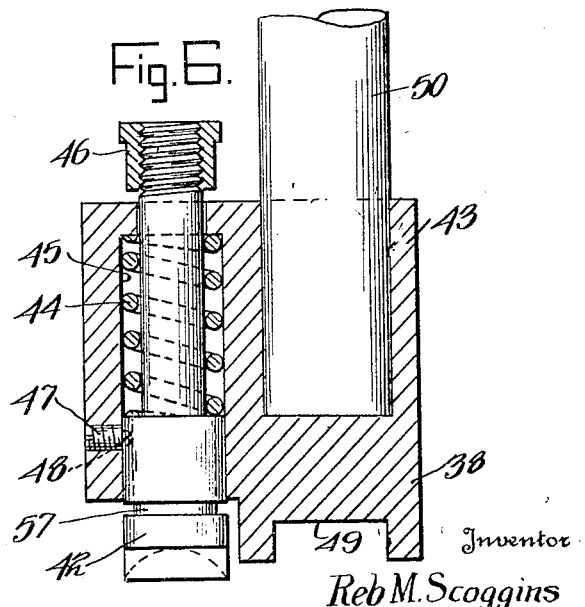

Patented Oct. 27, 1931

1,829,458

UNITED STATES PATENT OFFICE

REB M. SCOGGINS, OF SHREVEPORT, LOUISIANA

PIPE JOINT REAMER

Application filed February 10, 1930. Serial No. 427,378.

This invention relates to reamers designed primarily for reaming out lead packing or other packing in the bell joints of pipes used to secure together iron and other pipes, this application being in part a continuation of my application No. 179,657, filed March 30, 1927.

The object of the invention is to provide a simple, durable tool which can be used in trenches, ditches or other close places where pipe of this character is usually laid.

Referring to the accompanying drawings, which are made a part hereof and on which similar reference characters indicate similar parts, Figure 1 is a view in elevation of the device with parts shown in section, Figure 2 is a section on line 2—2 of Figure 1, Figure 3, a section substantially on line 3—3 of Figure 1, Figure 4, a section substantially on line 4—4 of Figure 1, Figure 5, a section of an enlarged detail taken on line 5—5 of Figure 4, Figure 6, a section of an enlarged detail taken on line 6—6 of Figure 4, Figure 7, a section on line 7—7 of Figure 1, and Figure 8, a section on line 8—8 of Figure 1.

In the drawings numerals 10 and 11 indicate the ends of the pipe, the end 11 having a bell 12 in which lead or other packing 13 is placed to render them joint tight. Numerals 14 and 15 indicate sections of a sleeve or ring which is secured upon the pipe 10, these rings may have extending ears 16 through which bolts 17 are threaded to clamp the sleeve upon the pipe 10. If desired the sleeve 14 may have radial screws 18 projecting inwardly to engage the outside of the pipe to hold it firmly in place. The end of the sleeve 14 is threaded at 19 to receive a cooperating sleeve 20 which is threaded on its interior at 21 to engage the screw threads 19 upon the sleeve 14. The end of the sleeve 20 has an outwardly extending flange on which ratchets 22 are cut. The sleeve 20 is composed of two sections which are placed around the end of the sleeve 14 and secured thereon by means of hooks constructed as follows: Secured to the rear end of the sleeve 20 are brackets 24 and 25. The bracket 24 having a perforation therethrough and the bracket 25 being U-shaped on its outer end. A bolt 26 secures the brackets together, this bolt is preferably square at its central portion and threaded on its outer end and carries a spring 27 which engages the outer edge of one of the brackets to hold the sections of the sleeve resiliently together so that the threads 21 of the sleeve 20 will be resiliently held in engagement with threads 19 on the sleeve 14. The purpose of this will later appear.

Surrounding the sleeve 20 is a ring 28. This ring is held against forward axial movement by a flange 29 near the outer end of the sleeve 20. The ring 28 is composed of two sections, these sections each having ears or lugs 30 through which bolts 31 are threaded to hold the sections together and to hold the ring on the sleeve 20.

The outer end of the ring 28 carries reaming tools 33 which are secured in the end of the ring by means of screws 34 and 35. The tools 33 are adjustably held in the end of the ring and may be secured in adjusted position by means of the screws just mentioned. The ring 28 is also provided with radial bores in which are positioned ball bearings 36 held in place by screws 37. The ball bearings engage the periphery of the pipe 10. Means for rotating the ring 28 carrying the reamers comprises a ring 38 surrounding the ring 28. This ring is composed of two sections hinged at 60 and secured together by means of a latch 61 pivoted to a lug on one half of the ring and engaging a lug on the other half of the ring, being secured thereto by a thumb screw 62. This ring 38 is positioned about a flange 39 on the ring 28 and prevented from axial movement by means of this flange and this flange is provided with ratchet teeth as shown at 40. The ring 38 is provided with radial dogs 41 and 42 shown in detail in Figures 6 and 5 respectively. The dog 41 is adapted to engage the teeth 40 of the ring 28 and the dog 42 engages the teeth 22 of the ring 20. The dog 42 consists of a plunger which is slidably mounted in a bore 45 in an enlarged portion 43 on the ring 38. The dog is downwardly pressed by means of a spring 44 which engages an enlarged shoulder on the plunger at its lower end and engages in the upper end of the bore 45. A head 46 may be screwed on the upper end of the plunger 42 to provide means for manually lifting the dog out of engagement with the ratchet teeth with which it engages. The enlarged lower portion of the plunger is slotted and a screw 47 having a small inner end 48 engages in this slot to prevent rotation of the dog. The inner end of the ring 38 has a groove 49 which fits over the ratchet teeth 40 and the flange 39. The ring 38 is rotated by means of a handle 50 which is secured in the enlarged portion 43 of the ring. The dog 41 is mounted in an enlarged portion 51 on the ring 38. This dog has an inner end cut to engage the ratchet teeth 39 to drive the ring 28 in one direction but to slide through them when the ring 38 is rotated in the other direction. The dog 41 is held in engagement with the ratchet teeth by means of a spring 52 which engages the upper end of a bore 53, and presses at its lower end on an enlarged shoulder 54 of the dog.

A screw 55 has a small inner end 56 which engages in a groove to prevent rotation of the dog 41. The dogs 41 and 42 each has a circumferential groove 57. When it is desired to hold either of the dogs out of engagement with the ratchets the plunger is lifted and given a slight turn until the end 48 or 56 of the screw 47 or 55 engages the groove to hold the plunger retracted. The dogs 41 and 42 may be retracted and given a 180° turn to position them for rotating the ring in the reverse direction to withdraw the reamers.

The end of the ring 28 has a flange 58 which has spaced at intervals about it arcuate notches 59. During oscillation of the ring 38, the ring 28 will be rotated by the dog 41 but the dog 42 will ride around the outside of the flange 58 and be held out of engagement with the ratchets 22. When the ring 28 has been rotated until the dog 42 may drop into a notch 59 this dog will then engage with a ratchet 22 on the ring 20 so that this ring will be rotated along with the ring 28. This tends to unscrew the ring 20 from the ring 14 to feed the reaming tools 33 into the work. As soon as the ring 38 moves in the reverse direction the dog 42 will ride out of the notch 59 and the ring 20 will not be further rotated until the ring 28 has been rotated through several notches. The notches 59 may be spaced apart any desired distance so as to have the ring 28 rotated any number of times greater than the ring 20 depending on how fast it is desired to feed the reaming tools into the work. If the operator desires the ring 28 may be rotated without feeding the tools toward the work at all. To do this the operator simply does not stop the dog 42 at a point at which it will drop into one of the arcuate depressions 59.

It will be obvious to those skilled in the art that various changes may be made in my device without departing from the spirit of the invention and therefore I do not limit myself to what is described in the specification and shown in the drawings but only as indicated in the appended claims.

Having thus fully described my said invention, what I claim as new and desire to secure by Letters Patent, is:

1. A device for reaming the lead out of bell joints of pipes comprising a sleeve adapted to be secured upon the pipe and having exterior screw-threads on one end, a second sleeve threaded upon the first sleeve, a ring mounted upon the second sleeve, said ring having reaming tools axially positioned therein, said second ring having ratchet teeth cut on the exterior of one end, a second ring rotatably mounted upon the first named ring, said second ring having manually reversible dogs engageable with the first named ring and with the ratchet teeth of the said sleeve for rotating the ring and the sleeve, and an annular flange with spaced arcuate notches about its interior for holding the dogs out of engagement with the ratchet teeth of the said sleeve except at predetermined spaced areas about the said second sleeve whereby rotation of the said second ring will rotate the first-named ring at each oscillation of the said second ring but will rotate the said sleeve only after a predetermined number of oscillations of the said second ring, substantially as set forth.

2. A tool for reaming the lead out of the bell portion of pipe joints comprising a sleeve adapted to be secured around the pipe, said sleeve having screw threads on the exterior of one end, a second sleeve formed of separable portions and resiliently held together and mounted upon the screw threads of the first-named sleeve, said second sleeve having ratchet teeth cut on the exterior of one end, a ring mounted on said second sleeve, said ring having reaming tools axially positioned therein engageable in the bell of the joint, said ring having ratchet teeth cut on the exterior of one end and having a flange with spaced arcuate notches about its exterior, an operating ring carried by said first-named ring, said operating ring having dogs engageable with the ratchets on the first-named ring for moving said ring and having additional dogs engageable with the ratchet teeth of the said second sleeve when said dogs ride in the said arcuate depressions on the said ring whereby the said first-named ring will be rotated through a greater number of revolutions than the said sleeve, rotation of the said sleeve serving to feed the reaming tools toward the work, substantially as set forth.

3. A tool for reaming the lead out of the bell portion of pipe joints comprising a separable sleeve adapted to be secured around the pipe, said sleeve having screw threads on the exterior of one end, a second sleeve formed of separable portions and resiliently held together and mounted upon the screw threads of the first-named sleeve, said second sleeve having ratchet teeth cut on the exterior of one end, a separable ring mounted on said second sleeve, said ring having reaming tools axially positioned therein engageable in the bell of the joint, said ring having ratchet teeth cut on the exterior of one end and having a flange with spaced arcuate notches about its exterior, an operating ring carried by said first-named ring, said operating ring having manually reversible dogs engageable with the ratchets on the first-named ring for moving said ring and having additional manually reversible dogs engageable with the ratchet teeth of the said second sleeve when said dogs ride in the said arcuate depressions on the said ring whereby the said first named ring will be rotated through a greater number of revolutions than the said sleeve, rotation of the said sleeve in one direction serving to feed the reaming tools toward the work and in the opposite direction to withdraw the tools therefrom by means of the reversible dogs, substantially as set forth.

In witness whereof I have hereunto set my hand and seal at Shreveport, Louisiana, this 3d day of February, A. D. nineteen hundred and thirty.

REB M. SCOGGINS.